(No Model.)
E. A. SMITH.
Earth Auger.
No. 243,641. Patented June 28, 1881.
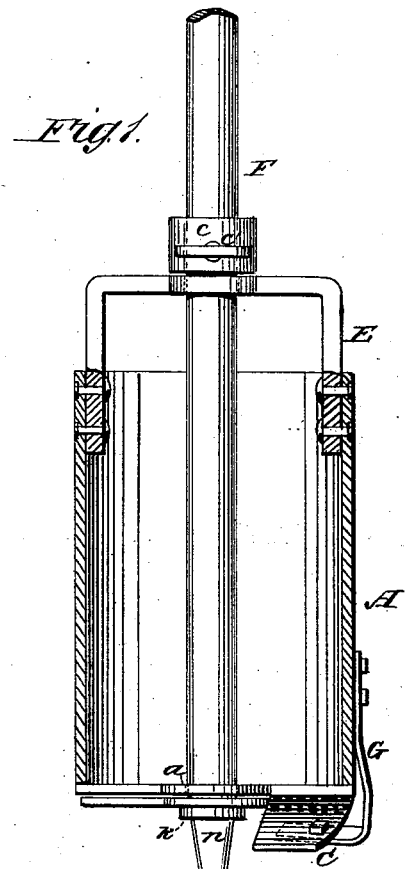
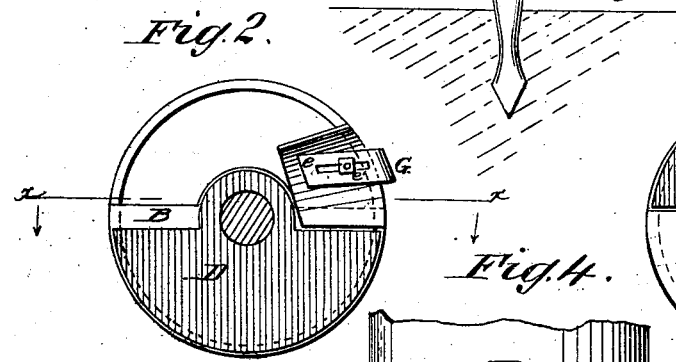
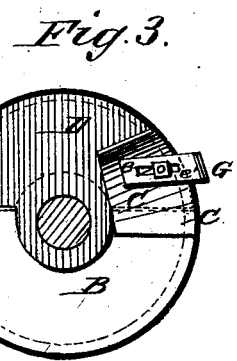
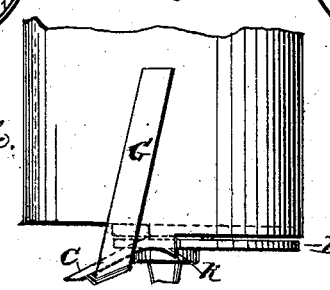
WITNESSES:
Francis McArdle.
C. Sedgwick
INVENTOR:
E. A. Smith
BY Munn & Co.
ATTORNEYS.
N. PETERS, Photo-Lithographer, Washington, D. C.

UNITED STATES PATENT OFFICE.

EDWARD A. SMITH, OF GREELEY, COLORADO.

EARTH-AUGER.

SPECIFICATION forming part of Letters Patent No. 243,641, dated June 28, 1881.

Application filed January 18, 1881. (No model.)

*To all whom it may concern:*

Be it known that I, EDWARD A. SMITH, of Greeley, Weld county, Colorado, have invented a new and useful Improvement in Earth-Augers, of which the following is a specification.

Figure 1 is a vertical section taken on line $x\ x$, Fig. 2. Figs. 2 and 3 are bottom sectional views, showing the cut-off plate in different positions; and Fig. 4 is a plan view.

Similar letters of reference indicate corresponding parts.

My present invention is an improvement on the patent granted to me August 3, 1880, and numbered 280,830; and the improvement consists in providing the semicircular bottom of the cylindrical casing with the cutting-blade, and the shaft with a semicircular cut-off plate, the edge of which is guarded by a projection on the bottom of the blade; also, in attaching an adjustable cutting-spring to the outside of the cylindrical casing for enlarging the bore.

The cylindrical casing A is half closed at the bottom by the semicircular bottom B, which carries the lower journal, $a$, for the shaft and the cutting-blade C, and is provided at the top with the skeleton-frame E, which is provided with the upper journal of shaft F. The shaft F is provided with the collar $c$ and set-screw $c'$ at the top, and at the bottom with the drill-point $n$.

The semicircular cut-off plate D is rigidly secured to the shaft and is turned by it to close the bottom of the casing when it is desired to remove it from the bore with its charge of dirt. The edge of the cut-off plate is guarded when the auger is in operation by the projection $k$ at the heel of the cutting-knife, to prevent earth and gravel from getting between the bottom plate and the cut-off plate, and this projection also furnishes the abutment for the plate to come against in turning the casing.

The spring-knife G, which enlarges the bore as the casing revolves, is secured to the side of the casing, as shown, and the lower end, which is bent to pass under the cutting-knife, is adjustable by means of the slot $e$ and bolt $c'$, which enters a screw-tap in the under side of the knife C.

The parts being in position, as shown in Fig. 1, the casing is to be rotated, and when it becomes full the shaft F is to be rotated in the reverse direction to the extent of half a revolution. This places the plate D in position to entirely close the bottom of the casing and allow it, with its contents, to be raised up from the bore.

Having thus described my invention, I claim as new and desire to secure by Letters Patent—

1. In an earth-auger, the casing A, having the semicircular bottom plate, B, provided with the cutting-knife C, and guard $k$, in combination with the shaft carrying the cut-off plate D, substantially as described.

2. The casing A, provided with the semicircular bottom plate, B, carrying the knife C, in combination with the adjustable spring-knife G, substantially as and for the purposes set forth.

EDWARD A. SMITH.

Witnesses:
WILLIAM H. FARR,
ARTHUR K. FULLER.